May 22, 1951  O. LEPERSONNE  2,554,039
SELF-ENERGIZING BRAKE

Filed March 21, 1945  4 Sheets-Sheet 1

Inventor
Octave Lepersonne

By T. J. Plante
ATTORNEY

May 22, 1951  O. LEPERSONNE  2,554,039
SELF-ENERGIZING BRAKE

Filed March 21, 1945  4 Sheets—Sheet 3

Inventor
Octave Lepersonne
By T. J. Plante
ATTORNEY

May 22, 1951  O. LEPERSONNE  2,554,039
SELF-ENERGIZING BRAKE
Filed March 21, 1945  4 Sheets-Sheet 4

Fig.6

Inventor
*Octave Lepersonne*

By *T. J. Plante*
ATTORNEY

Patented May 22, 1951

2,554,039

UNITED STATES PATENT OFFICE 2,554,039

SELF-ENERGIZING BRAKE

Octave Lepersonne, Brussels, Belgium

Application March 21, 1945, Serial No. 583,933
In France March 22, 1944

13 Claims. (Cl. 188—78)

The present invention relates to the class of self-energizing brakes which utilize a rotating drum and internal shoes. In such brakes, the tangential force of rotation exerted by the drum on the primary shoe is transmitted through a member interconnecting the shoes to the secondary shoe, which anchors on the backing plate, the torque exerted on the secondary shoe by the primary shoe being increased due to the frictional force exerted by the drum on the primary shoe.

It is well known that such brakes can generate a relatively high braking torque for a given force exerted by the actuating member, as compared with brakes of other types; but this high braking power is realized only by sacrificing the symmetry of operation of the brake; in other words, the greater the power of the brake, the larger is the ratio between the braking torque of the secondary and primary shoes; and the larger is the ratio of the pressures exerted on the drum by the shoes. This unbalance of pressures generates a resultant force which tends to make the drum eccentric with respect to its rotating axle.

Efforts have been made to remedy this fault (which also exists in brakes in which the shoes are independent and are directly pivoted on the backing plate). One proposed remedy consists of inserting between the primary and secondary shoes a lever having unequal arms. Such a lever reduces the amount of force applied against the secondary shoe, and thus reduces the magnitude of the torque generated by said shoe. It also has been suggested that other devices of various kinds be placed between the primary and secondary shoes to reduce the magnitude of the exit reaction force of the primary shoe on the secondary shoe. However, such devices increase the intricacy of the brake and have not been practically applied.

The present invention is intended to provide means for controlling the self-energizing factor, i. e. the ratio between the secondary shoe and the primary shoe. In accordance with the invention, the desired ratio is obtained by establishing, in an appropriate manner, fixed directions for the force of entry and the exit reaction force acting on the shoes, and by judiciously selecting the points of action of these forces on the shoes, particularly by placing the point of action of the force of entry on the primary shoe in the vicinity of the center of said shoe. The invention permits modification at will of the distribution of torque between the shoes, and, most important, permits division of the torque equally between the shoes, thus giving a brake having symmetric operation.

Another object of the invention is to provide a self-energizing brake having two shoes of substantially equal angular magnitude, in which one of the shoes acts as primary shoe in both directions of drum rotation and the other shoe always acts as secondary shoe, under the impulsion it receives from the primary shoe.

The invention is intended to lessen the excessive sensitivity of any brake to variations in the coefficient of friction of the shoe linings, which coefficient, as a rule decreases rapidly when the temperature of the linings increases due to heat generated by braking action.

In particular, the invention provides means for stabilizing the directions both of the axis of reaction, and of the axis of pressure, the former representing the normal component of the drum reaction on the shoe, and the latter representing the drum radius at which the maximum unit pressure on the shoe is exerted.

The invention permits the provision of a self-energizing brake in which variations of the coefficient of friction have no effect on the position of the drum radius along which maximum pressure is exerted on the linings of both shoes. By virtue of this accomplishment the pressure axis is stabilized in fixed position for both directions of drum rotation. This makes it possible to build a self-energizing brake in which, for both shoes, the position of the radius of maximum pressure, i. e. the pressure axis, is stabilized for both directions of drum rotation and regardless of variation of the coefficient of friction of the lining. The foregoing characteristics are embodied in a brake when the forces of entry action and of exit reaction which act on the primary and secondary shoes are so directed that, for both directions for rotation of the drum and for both shoes, the point of intersection of the vectors representing these forces coincides with the center of reaction of the respective shoe.

Other ojects and advantages of the invention will become apparent during the following description, reference being had therein to the accompanying drawings, in which:

Figure 1:
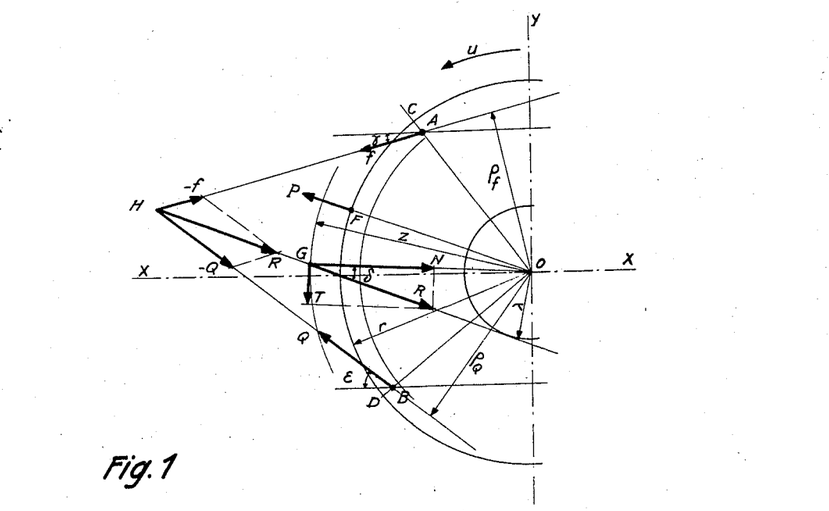
Figures 1, 2, and 3 show explanatory operating diagrams illustrating the relationship of the forces acting within a brake.

Figure 1 shows that, in a drum brake of inside radius $r$, turning in the direction of arrow $u$ and in which operates a shoe of angular opening COD, a force $f$ applied at the toe end of the shoe generates in B, pivoting center of the shoe, a reaction Q. The directions of forces $f$ and Q intersect at point H; the composing of forces $-f$ and $-Q$ at H gives a resultant R which measures in magnitude and in direction the drum reaction on the shoe. The vector representing this reaction extended in its own direction, intersects at G a circumference of a radius $z$, the length of which may be determined by calculation.

This circumference of radius $z$ is called the circumference of reaction. The direction OG, which corresponds to the normal component of the drum reaction R, is called axis of reaction of the shoe and point G is called center of reaction.

The decomposition of force R between the drum radius $r$ corresponding to direction OG, i. e., the axis of reaction, and the perpendicular to this axis, which is tangent to the circumference of reaction, gives, on one hand, the normal component N the direction of which makes with that of R the angle of friction $\delta$ of the lining of the shoe against the drum and, on the other hand, the tangential component T, such that the product $T.z$ meaures in total magnitude the braking torque generated by the shoe. The maximum pressure borne by the lining per unit length of lining, called maximum unit pressure P, a pressure which varies in each section of the lining following a cosinusoidal rule, is applied at point F situated on radius OF, called axis of pressure, the direction of which differs from that of the reaction axis but, when the reaction axis bisects the arc of the lining, reaction and pressure axes coincide. Point F is called center of pressure of the shoe.

The rational study of the forces applied to a shoe shows that, for a brake of determined characteristics, the position of the reaction and pressure centers and the directions of the reaction and pressure axes of these shoes depend on the angular opening of their friction linings, on the coefficient of friction of said linings and on their positions on the shoes in relation with the positions of the points of application and the directions of the forces acting on the shoe.

The torque $T.z$ generated by the shoe is also equal to the torque of the drum reaction R on the shoe relative to the center O of said drum, i. e., to the product of the drum reaction R by radius $\lambda$ of the circumference of radius $\lambda = z.\sin \delta$ therefore:

$$z = \frac{\lambda}{\sin \delta}$$

and $$M = T.z = \frac{T}{\sin \delta} \cdot \lambda$$

and in triangle GTR: $M = R.\lambda$.

This shows that the torque generated by a brake may be measured with reference to the reactions $R_1$ and $R_2$ of the drum on the shoes, reactions whose directions and magnitudes are the resultant of the forces of entry and of the exit reactions exerted on the shoes. One of the characteristic features of the invention consists in determining the torque generated by the respective shoes and consequently the ratio of these torques, i. e., the coefficient of self-energization of the brake, by a judicious control of forces $f$ and Q acting on each of the shoes and first in assigning to these forces fixed and suitable directions.

Figure 1 shows that, if pivotal point B of the shoe is brought nearer to the center O of the drum, the direction BH is less and less inclined on the direction HR of the drum reaction with, as consequence, the increase of R and this more as B comes nearer to O. R becomes infinitely great for such a position of B as BH, when it coincides with HR. The figure shows that it is possible to make R vary and consequently $R.\lambda$, i. e., the torque of the shoe, in modifying the position of B, center of rotation of the shoe, in relation to the drum center O.

On the other hand, if for any reason the coefficient of friction of the lining happens to be modified as it is the case when the brake heats, the direction of HR varies on account of the variation of angle $\delta$ determining the variation of $\lambda = z.\sin \delta$ and consequently the length of vector R, i. e., the intensity of the drum reaction on the shoe and, finally, the torque $R.\lambda$; if $\delta$ increases, i. e., if the coefficient of friction of the lining increases, the torque increases and vice versa.

Figure 2:
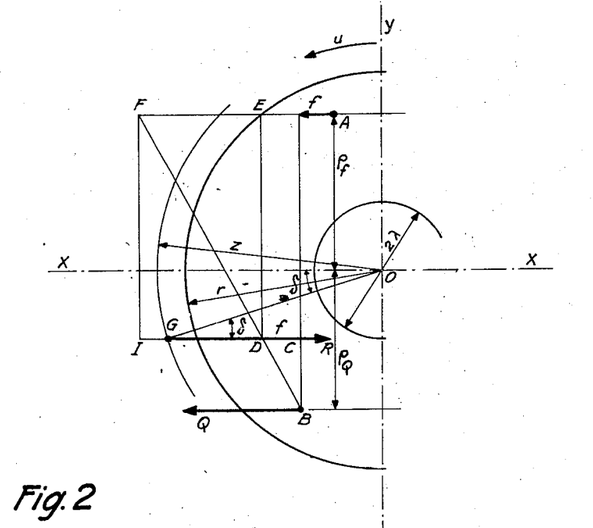

Figure 2 represents the primary shoe of a self-energizing brake in which the force of entry $f$ is parallel to the exit reaction Q. The resultant of these two forces is also parallel to $f$ and Q and to the axle of reference OX. It is easy to calculate the torque of such a shoe by a diagrammatic tracing in the special case where the reaction axis bisects the arc of the lining.

In drawing out this diagram, we know the total arc of the lining, the inner radius $r$ of the drum and the angle $\delta$ of friction of the lining. With this data, it is possible to trace the circumference of radii $r$ and $\lambda$ and to draw the tangent to the circumference of radius $\lambda$ parallel to axis OX. This tangent cuts the circumference $z$ at point G, center of reaction of the shoe and coincides with the direction of the reaction R of the drum on the shoe. In application to the laws of mechanics, radius OG, called axis of reaction of the shoe, forms, with the direction of drum reaction R, the angle of friction $\delta$. In order to determine the intensity of the drum reaction Q exerted on the shoe, there is drawn from B, pivoting point of the shoe, the perpendicular BC to OX. From C a length equal to $f$ is carried in CD on line GC. B is connected to D and BD is prolonged to F, point of intersection of the directions of BD and of vector $f$ from point A of actuation of the shoe. Thus: $EF = Q$ and $CI = R$ as in this case $R = Q + f$ in algebraic addition.

The equation of the torques of forces $f$, Q and R in reference to the centre O of the drum is:

$$M = R.\lambda = Q\rho_Q - f\rho_f$$

which is also the case for Figure 1.

Figure 3:
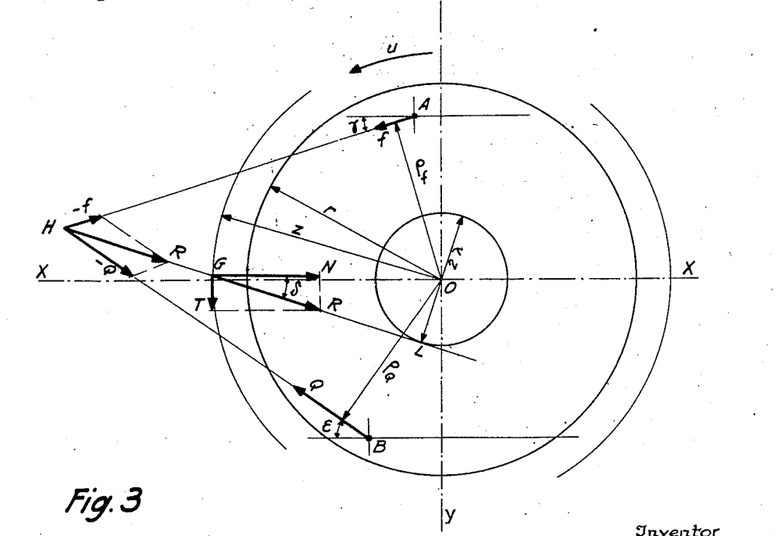

In Figure 3, similar to Figure 1, $f$ and Q have different directions and the arrangement is such that the vectors which represent these forces make, with the reference axle OX, angles $\gamma$ and $\epsilon$ and as the directions of these vectors intersect as point H, force $f$ is equal to force $f$ in Figure 2. It may be seen that, in case of Figure 3, vectors Q and R have different values from those in Figure 2 and that the forces they represent are smaller.

In this case too:

$$M = R.\lambda = Q\rho_Q - f\rho_f$$

R being the diagonal of the parallelogram built with forces $f$ and Q as sides. A consequence is that any variation in either the length of the sides of the parallelogram or their direction relative to one another will cause a variation in the length of the reaction R and for a given value of λ i. e., for a constant coefficient of friction, a variation in the braking torque $R.\lambda$ generated by the shoe.

It is possible, in modifying the angles γ and ε of the directions the forces $f$ and Q of the shoe make with the axle of the brake OX to reduce or to increase the braking torque without altering the values of said froces $f$ and Q.

The judicious use of these means: the conferring to angles γ and ε of each of both shoes of values contained between predetermined limits in view of realizing the looked for result, forms one of the characteristic features of the present invention.

In view of avoiding this drawback and of obtaining the means of distributing at will the total torque between the two shoes, and not only without reduction in the power of the brake but even in increasing its power, the invention provides the use of the combination of the two following means:

1. To bring nearer to the axle OX of the brake the point on which acts the action of entry of the primary shoe,
2. To impose judicious directions to the actuating and reacting forces acting on the shoes, these two means allowing either to realize the equality of the torques of the primary and of the secondary shoes, either to grant some preponderance to one shoe on the other and so to obtain a coefficient of self-energization equal to unity, greater or smaller than unity and this being achieved without reduction of the total power of the brake.

Figure 4:
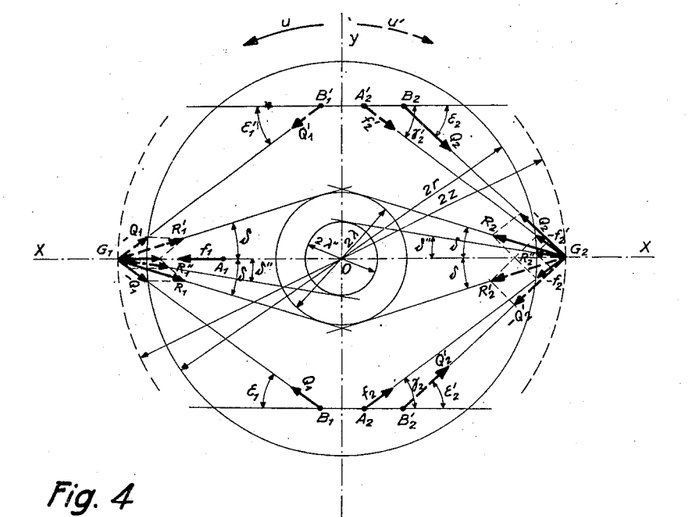
Figures 4, 5, and 6 show operating diagrams of three different brake embodiments which follow the present invention.

Figure 4 shows a brake according to the invention and drawn in conformity to the means herein described. In such a brake, force $f_1$ acts in the direction of the axis of symmetry OX of the brake and this force may be generated either by the direct action of one force only acting in the direction of axis OX or in the vicinity of this axis or by the action of two forces acting substantially at equal distances from axis OX and having directions which may be parallel to OX or diverging or converging one to the other but symmetrically placed or near by with reference to the axis OX, their directions passing or not through the centre O of the drum.

In accordance with the invention, the actuation of the primary shoe in the direction of axis OX or nearly so is used to make said shoe react by either of both its ends $B_1$ or $B_1'$ on the secondary shoe following the direction of rotation of the drum, in such a way that the primary shoe acts always as primary shoe and the other shoe always as secondary shoe under the impulsion it receives from the primary shoe respectively in $A_2$ and $A_2'$ and anchors on the backing plate in $B_2$ or in $B_2'$.

In the embodiment shown in Figure 4, the vector representing the force of entry $f_2$ applied on the secondary shoe makes with axis OX, which stands in the symmetrical plane of the brake, an angle $\gamma_2$ differing from angle $\epsilon_2$ made with the same axis by the vector representing the exit reaction $Q_2$ exerted on this shoe.

It is obvious that, as shown by the diagram, $\gamma_2 < \epsilon_2$. It is alike for the reverse direction of rotation for which $\gamma_2' < \epsilon_2'$.

Because the actuating member actuates one only of the two shoes it is possible to make this member exert a double force on this particular shoe for the same travel and equal force applied on the pedal so that the force of entry applied on the primary shoe becomes $2f_1$. But, as the actuating member actuates the primary shoe at its center point, the travel needed to apply said shoe against the drum will be half of that which should be needed should the member actuate the shoe at its toe, i. e., at a double distance from the pivoting point $B_1$ of the shoe.

Figure 4 shows on the other hand that the directions of the entry and exit forces acting on both shoes are such that, for each shoe, the point of intersection of the directions of the vectors representing these forces coincides respectively with the corresponding reaction centers $G_1$ and $G_2$ from which it follows that the directions of axes $OG_1$ and $OG_2$ like those of the pressure axes of both shoes are no longer modified by the variations of the angle of friction force of the linings. When the linings are symmetrically placed with reference to the reaction axes, these axes coincide with the corresponding pressure axes and the directions of said axes are no longer modified by the reversing of the rotation of the drum. Indeed, Figure 4 shows that, if the rotation of the drum is reversed and if the coefficient of friction happens to vary in such a way that the angle of friction varies from λ to $\lambda'' < \lambda$ the directions of $R_1$ and $R_2$ vary but the centers of reaction $G_1$ and $G_2$ of both shoes as well as the pressure axes which coincide with the reaction axes when the linings are symmetrically placed with reference to these axes, maintain their original positions.

Owing to the fact that the pressure axes have fixed positions, the points of maximum wearing of the linings do not depend on the variations of their coefficient of friction or of the reversing of the rotation of the drum and this is one of the very favorable operating characteristics of this brake.

The braking torque generated by each of the shoes is equal for each of both directions of rotation of the drum.

Referring to the diagram of Figure 4, it may be verified that the parallelograms of the forces acting on the respective shoes for one direction of rotation of the drum are symmetrical with reference to the same parallelograms for the reverse direction of rotation. For each of the shoes said parallelograms have a common apex which coincides with the respective centers of reaction $G_1$ and $G_2$. The drum reaction exerted on the respective shoes for the reverse direction of rotation of the drum which is represented by the vectors $R_1'$ and $R_2'$ are respectively equal to vectors $R_1$ and $R_2$; it follows that each of the shoes generates equal braking torque for both directions of rotation of the drum.

It may be seen that, with regard to the primary shoe, the parallelograms of the forces have a common side of fixed direction which corresponds to the vector representing the force of entry $f_1$ applied to this shoe, while the direction of the adjacent side corresponding to the vector representing the exit reaction of said shoe varies with the direction of rotation of the drum but the length of this vector is equal for both directions of rotation. As regards the secondary shoe, the adjacent sides of the parallelogram of forces corresponding to the vectors representing the force of entry and the exit reaction have fixed directions but their lengths vary with the direction of the rotation of the drum. If, for any cause, for instance on account of the heating of the brake, the angle of friction should decrease to $\delta''$ the drum reactions exerted on the shoes should respectively be represented by vectors $R_1''$ and $R_2''$ aligned in the directions of the respective tangents to the circumference of $2\lambda''$ diameter. The diagram shows that these vectors are substantially smaller than the vectors $R_1$ and $R_2$ which denotes a consequent reduction of the braking torque of the shoes. Nevertheless, this modification of the coefficient of friction does not affect the positions of the axes $OG_1$ and $OG_2$.

The condition that the acting and reacting forces of the shoes converge to their respective centres of reaction $G_1$ and $G_2$ together with the condition imposing the positions of the points where these forces act on the shoes and more particularly of the reacting points $B_1$ and $B_2$ fix the directions of the vectors representing these forces of entry and of exit on the shoe, i. e., the magnitude of angles $\epsilon_1$, $\gamma_2$ and $\epsilon_2$ under the condition that $\gamma_2 = \epsilon_1$; these angles should be larger or smaller as $B_1$ and $B_2$ are nearer or farther away from the center O of the drum. If $B_1$ and $B_2$ are brought nearer to the center O, angles $\epsilon_1$, $\gamma_2$ and $\epsilon_2$ decrease and the power of the brake increases; inversely if $B_1$ and $B_2$ are brought farther away from the center O, said angles increase and the power of the brake decreases.

It is obvious that the invention extends to brakes in which the directions of the vectors figuring the forces of entry and the exit reaction acting on each of the shoes coincide or nearly coinside with the centre of reaction of each respective shoe.

Figure 5:
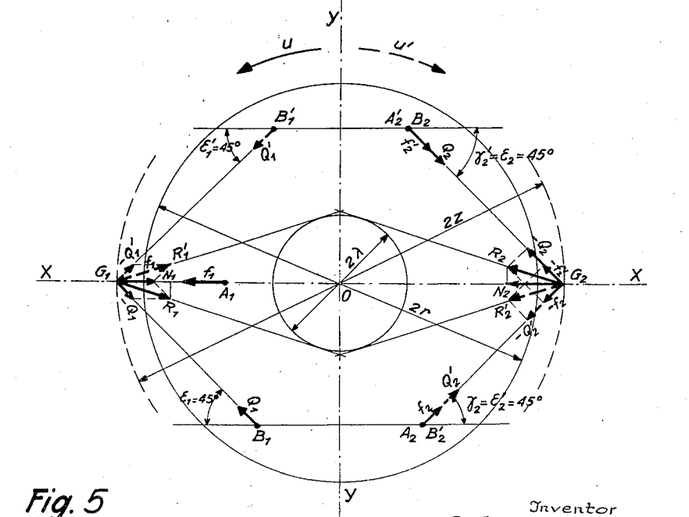

Figure 5 shows a brake in which the total braking torque has been equally divided between the shoes. In said brake, $\epsilon_1 = \gamma_2 = \epsilon_2$ 45°. The diagram shows that $R_2 = R_1$ and consequently $M_2 = M_1$ as radius $\lambda$ is equal for both shoes, the arcs of linings being of equal angular opening and said linings being identically placed on the respective shoes and having same coefficient of friction.

The torques generated by these shoes are respectively $R_1.\lambda$ and $R_2.\lambda$ and, as $\lambda$ has equal value for both shoes, when $R_1 = R_2$ the braking torque will be equal for both shoes.

In this diagram, $f_1$ has the same value as in the former diagrams but it must be borne in mind that, for equal force and travel of the pedal, the force of entry acting on the primary shoe is $4f_1$ to which correspond, not $R_1$ and $R_2$ but $4R_1$ and $4R_2$.

Figure 5 shows that it is possible to modify $R_1$ by judiciously placing the point at which acts the force of entry on the primary shoe as well as the position of its reacting point $B_1$ in imposing the direction to its exit reaction $Q_1$; said exit reaction is transferred in $A_2$ acting point of $f_2$ on the secondary shoe and $f_2 = Q_1$ if $\gamma_2 = \epsilon_1$ as is the case in Figure 5.

The transferring of $f_2$ to $G_2$ center of reaction of the secondary shoe following the direction $A_2G_2$ makes it possible to obtain $R_2 = R_1$ in the following way: vector $N_2 = N_1$ is traced from $G_2$ in the direction of OX; from the end of vector $N_2$ a perpendicular to OX is drawn unto its intersection with the tangent to the circumference of radius $\lambda$ traced from $G_2$ which forms, on said tangent, the vector $R_2 = R_1$; ends of vectors $R_2$ and $-f_2$ traced from $G_2$ shall be joined, which gives the direction of the exit reaction $Q_2$ of the secondary shoe in which direction shall be placed the reacting member of the shoe on the backing plate.

Equal braking torques are generated for both directions of rotation of the drum by both shoes as this follows from the parallelograms of forces drawn on the diagram, said parallelograms for the reverse direction of rotation of the drum being symmetrical to the parallelograms of forces for the direct rotation as herein explained in Figure 4.

Figures 4 and 5 show that the forces of entry $f_1$ and $f_2$ and the exit forces $Q_1$ and $Q_2$ acting on the shoes have directions all different one from the other, this being a necessary condition if it is desired that the ratio of the torques generated by the shoes should be unity with angles $\epsilon_1 = \gamma_2$.

Figure 6:
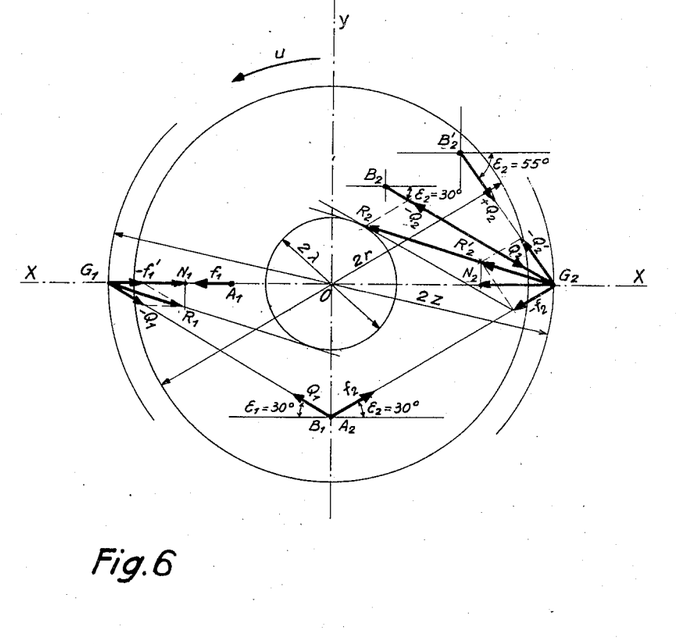

In the alternative diagram shown on Figure 6, $\epsilon_1 = \gamma_2 = \epsilon_2 = 30°$ It may be verified on the diagram that the only result of having reduced said angles from 45° to 30° is to increase the values of $R_1$ and $R_2$ and consequently the total torque of the brake, the coefficient of self-energization becoming about 2, 3; this increase in power of the brake is in proportion to the increase of the coefficient of self-energization. In Figure 6, $B_1$ coincides with $A_2$.

Said Figure 6 shows that, if instead of taking $\epsilon_1 = \gamma_2 = \epsilon_2 = 30°$, it should be taken $\epsilon_1 = \gamma_2 = 30°$ and $\epsilon_2 = 55°$, the coefficient of self-energization of the brake will fall to 1 but the brake will generate a total torque which, although lower than than the one generated with $\epsilon_2 = 30°$, will be higher than the torque generated by the brake in which all angles are 45° and the torque is still greater than the one generated by any other type of routine self-energizing brake of similar dimensions.

In practical use and with linings of rational angular openings, angles $\epsilon_1$, $\gamma_2$ and $\epsilon_2$ measured from the symmetrical diameter OX of the brake bisecting both arcs of linings will be preferably taken between 25° and 50°. If these angles are lower than 25°, reacting points $B_1$ and $B_2$ of the shoes come too near to the drum centre O, the brake is very powerful but may want of operating steadiness; if these angles are larger than 50°, the brake action will be very steady but it may show a lack of braking power.

Similarly, the angles formed between the direction of the entry force $f_1$ on the primary shoe or of the resultant of these forces of entry applied to said shoe and the direction of the exit reactions $Q_1$ and $Q_1'$ corresponding to direct and reverse directions of rotation of the drum will preferably be taken between 25° and 50°.

The preferred numerical values for the application of the present invention can be expressed in saying that the point where the force of entry $f_1$ is applied on the primary shoe, or the resultant of the entry forces on said shoe, is situated at a distance from pivoting point $B_1$ of the shoe on which the exit reaction $Q_1$ is applied, comprised between ½ and 3/2 of the length of the drum radius $r$.

It is obvious from what has been herein explained, that the invention describes the means for providing a brake showing a total operating insensibility to the variations of the coefficient of friction of the linings and to the reversing of the rotation of the drum and permits dividing the torque generated by the brake between the shoes according to the end aimed at.

Figure 7:
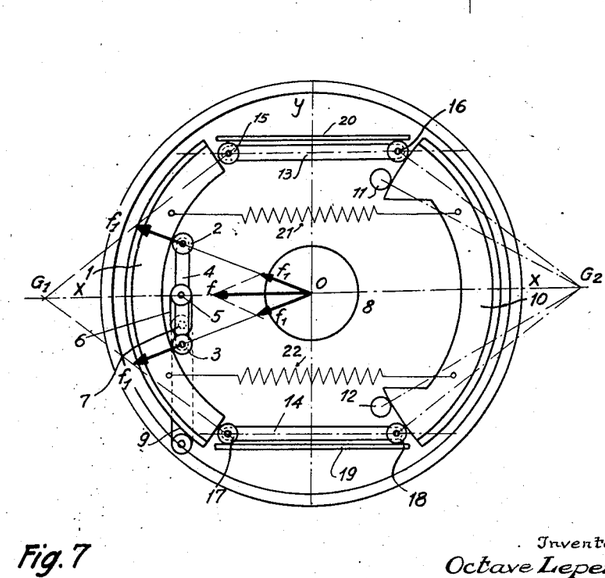
Figure 7 is a schematic showing of a brake incorporating the present invention.

In the schematic drawing of Figure 7 representing as an example a brake following the invention, the primary shoe 1 is actuated in two points by radial forces through rollers 2 and 3 pivoted on the rocking lever 4, the rollers 2 and 3 being placed at equal distances from axis OX and acting radially on the shoe. The rocking lever 4 may swing freely on pivot 5 which is fastened on lever 6 which lever is pivoted at 7 on the backing plate 8. The lever 6 and the actuating lever 9 are fastened on pivot 7. The whole: rocking lever 4, rollers 2 and 3 and lever 6 are placed inside the brake. The drawing shows that the operating rollers 2 and 3 borne by the rocking lever 4 transmit to the primary shoe 1 a double impulsion represented by two vectors $f_1$ corresponding to the adjacent sides of a parallelogram built on two radii of the drum passing through the axes of said rollers, a parallelogram the diagonal of which is the vector $f$ representing the force of entry transmitted to the rocking lever 4 by levers 6 and 9. The secondary shoe 10 may anchor on stops 11 and 12 fixed on the brake plate according to the direction of the rotation of the drum.

The shoes react on one another through the connecting rods 13 and 14 bearing rollers 15, 16, 17 and 18, said rollers abutting against inclined faces on the ends of the shoes. The rollers 15, 16, 17 and 18 can roll on guides 19 and 20 fixed to the backing plate. Recoiling springs 21 and 22 are placed between the shoes near their ends. It may be noticed that the bearing faces of the shoes which engage with the rollers and with the fixed abutments 11 and 12 are flat and are so inclined as to impose required fixed directions on the entry forces and on the exit reactions of the shoes.

In the dispositions represented on said figure, the bearing faces of the secondary shoe corresponding respectively to the forces of entry applied by rollers 16 and 18 and to the exit reactions acting on fixed abutments 11 and 12 are differently inclined so that these forces pass through same center of reaction which is on the axis OX of the brake for the two directions of rotation of the drum.

This brake is quite symmetrical in reference to a diametrical plane in which the axis of the brake is situated so that the brake may be fitted with shoes of equal angular openings which is an interesting industrial benefit. For instance in the case of Figure 7, the primary shoe corresponds to the secondary shoe except for the abutting nibs on rests 11 and 12. It will be easy to place linings of angular openings proportional to the torque generated by each of the shoes when these torques differ but little from one another so that the unit pressures they bear are equal for both shoes, from which results an equal wearing of the linings. This is too an interesting industrial advantage as the linings wearing equally may be renewed conjointly which is not the case for the usual brakes, self-energizing or not, in which the lining of one shoe wears much more quickly than the one of the other shoe.

Figure 7 shows only a schematic drawing of the brake in order to illustrate by a mere non-limiting example how there may be provided, in a specially advantageous way, a brake following the invention, allowing control of the coefficient of self-energization of a self-energizing two shoe brake and stabilization of the reaction axes of the shoes independently of the variations of the coefficient of friction of the linings and of the reversing of the direction of rotation of the drum.

Thus the invention provides means for accomplishing the looked for division of the total torque generated by a self-energizing brake between primary and secondary shoes and particularly for obtaining the equality of the torques to derive, for equal force applied on the pedal or other means of actuating the brake and equal travel of said means, the maximum total torque which can be generated by a two shoe self-energizing brake and for fixing the positions of the pressure axes of the shoes for both directions of rotation of the drum and independently of the variations of the coefficient of friction of the linings.

I claim:

1. A self-energizing brake with a two way rotatable brake drum, inside of which are located two arcuate brake shoes of substantially equal arcuate length, symmetrically facing each other with regards to a diameter of the drum which is its symmetrical diameter and engageable with the drum, the improvement comprising a primary floating shoe mounted for limited rotary motion in either direction of rotation of the drum and for in-and-out-of-engagement position therewith, means for releasably moving said primary shoe into braking contact with said drum with a force substantially acting in the direction of the cross-sectional diameter perpendicular to the drum symmetry diameter with regards to the location of the shoes inside the drum, said cross-sectional diameter substantially bisecting the arcuate lining of said primary shoe, a secondary floating brake shoe mounted for in-and-out-of-engagement position with said drum and bearing an arcuate lining located on the shoe so as to be substantially bisected by the cross-sectional diameter of the drum, stop means at each end of said secondary shoe to secure said shoe against rotation in either direction thereof, abutting surfaces provided at each end of both primary and secondary shoes, a connecting member between said primary and secondary shoes, the abutting faces of the connecting member between the shoes and of the stops of the secondary shoe being so dimensioned and arranged as to impart fixed directions to the forces of reaction at said abutting faces of the shoes and to cause the thrust directions of said shoes to intersect substantially on the cross-sectional drum diameter.

2. Improvement according to claim 1 in which the entry action on the primary shoe and the brake torque transmitting means and abutting means of the shoes are positioned and arranged at each end of the primary and secondary shoes so that the thrust directions thereof have respective common points of intersection for each shoe located substantially on the cross-sectional diameter of the drum at a distance from the center of the drum from 1 to 1.5 the length of the inside radius of the drum respectively for either shoe.

3. Improvement according to claim 2 in which the points of intersection of said thrust directions substantially register with the center of reaction respectively of either shoe.

4. Improvement according to claim 3 in which the abutting faces of the transmitting and of the abutting means of the shoes are so coordinated as the thrust directions thereto driven form angles from 25° to 50° with the cross-sectional diameter of the brake drum.

5. A self-energizing brake with a two way rotatable brake drum inside of which are located two arcuate brake shoes of substantially equal arcuate length, symmetrically facing each other with regards to a diameter of the brake drum which is its symmetrical diameter, the improvement in combination with such brake drum comprising a primary floating substantially arcuate surfaced brake shoe mounted for limited rotary motion in either direction of rotation of the brake drum and for in-and-out-of-engagement position therewith, an inner arcuate sliding surface substantially concentric with the arcuate surface of the lining of said primary shoe and with the center of rotation of said brake drum, means slidably engaging said inner arcuate surface and releasably actuatable in a substantially radial direction with respect to said center of rotation, with a resultant force for moving said primary shoe into braking contact with said drum substantially in the direction of a cross-sectional diameter perpendicular to the symmetrical diameter of said drum substantially bisecting the cross-section of the arcuate braking lining of said primary shoe and substantially registering with said cross-sectional brake drum diameter, inclined abutting surfaces for each end of said primary shoe, a substantially floating arcuate surfaced secondary brake shoe mounted for in-and-out-of-engagement position with said drum, inclined abutting surfaces for each end of said secondary shoe, stationary stop means with inclined surfaces for each end of said secondary brake shoe to secure the same against rotation in either direction thereof, the surfaces of these abutting and stop means being so coordinated as the points of intersection of the thrust directions of the respective shoes are substantially located on the cross-sectional drum diameter so as to register substantially with the respective centers of reaction of either shoe, torque transmitting means between each two opposing ends of said primary and secondary shoes and each brake shoe slidably engaging the inclined surfaces of said torque transmitting means and guide means for each of said torque transmitting means and in engagement therewith for imparting to the torque thrust transmitted in either direction of rotation of the drum a direction registering substantially with said cross-sectional diameter, the inclination of the sliding abutting surfaces at each end of said primary brake shoe being substantially congruous and arranged so that the line of torque thrust at either end of said primary brake shoe substantially intersects in a common point substantially located on the cross-sectional diameter of the drum and substantially at the center of reaction of said primary shoe, the inclination of the sliding surfaces at each end of said secondary brake shoe being substantially congruous and arranged for a braking force thrust direction at either end of said secondary shoe substantially intersecting in a common point located on the cross-sectional drum diameter substantially at the center of reaction of said secondary shoe, the angles formed by the transmitted torque thrust and the cross-sectional drum diameter being from 25° to 50°.

6. A self-energizing brake having a two-way rotatable brake drum, the improvement in combination with such drum which comprises a primary floating brake shoe, a secondary floating brake shoe, both said brake shoes being of substantially equal arcuate length, mounted for in-and-out-of-engagement position with said drum and substantially symmetrically positioned relative each other, torque transmitting means positioned between each two opposing end portions of said first and second shoes and each movable with said primary shoe throughout the latter's arc of rotation substantially in abutment therewith, stop means on the back plate of such drum to substantially stop rotation of said secondary shoe in either direction of drum rotation, means for releasably moving said primary shoe into braking contact with said drum in the direction of the cross-sectional drum diameter bisecting said shoes, and camming means for each end of said secondary shoe, each cooperatively carried by its torque transmission means and its abutting secondary shoe end portion and both dimensioned and positioned to cam out said secondary shoe and wedge the same against both said transmission means upon torque transmission by one.

7. Improvement according to claim 6 in which each said torque transmitting means and its abutting primary shoe end portion is cooperatively dimensioned and positioned to move said primary shoe outwardly with a thrust direction for each said primary shoe end having a substantially common point of intersection on said cross-sectional diameter beyond the primary shoe braking surface.

8. Improvement according to claim 7 in which said torque transmission means include means secured to the drum back plate to define a substantially fixed two directional path of movement for each of said transmission means.

9. Improvement according to claim 8 in which said camming means each include a camming and wedging surface having an average slope defining for both such surfaces decreasing angular distances between corresponding camming points at the secondary shoe ends upon outward movement of said secondary shoe.

10. Improvement according to claim 9 in which said primary shoe carries an inclined inwardly sloping thrust surface at each end thereof and in which said torque transmitting means are mounted for abutment against said primary shoe end surfaces, the inclination of each of said primary shoe surfaces and said means for defining said path of movement for said transmission means being coordinated to produce at either end of said primary brake shoe a resultant thrust in a direction having in each case said common point of intersection on said diameter beyond said primary shoe braking surface.

11. Improvement according to claim 9 in which the average slope of said camming and wedging surfaces of said secondary shoe is coordinated with said means for fixing said path of movement of said transmission means to produce at either end of said secondary brake shoe a resultant thrust in a direction having in each case a substantially common point of intersection on said cross-sectional diameter beyond said second shoe braking surface.

12. Improvement according to claim 11 in which the surface inclination and slopes of said surfaces and said means for fixing said path of movement for each of said transmission means are so coordinated that the thrust directions of the resultants at each end of each said brake shoes result in common points of intersection on said cross-sectional diameter substantially equidistant from and beyond the first and second shoe braking surface.

13. Improvement according to claim 12 in which said surface inclinations and angle of slope are so coordinated with the angle of torque thrust as defined by said means fixing said path of movement for said transmission means that the thrust direction of said resultants forms angles with the torque thrust direction of said transmitting means of from 25°–50°.

OCTAVE LEPERSONNE.

(References on following page)

REFERENCES CITED

The following references are of record in the file of this patent:

UNITED STATES PATENTS

| Number | Name | Date |
|---|---|---|
| 1,710,338 | Bendix | Apr. 23, 1929 |
| 1,804,929 | Girling | May 12, 1931 |
| 1,901,695 | Bendix | Mar. 14, 1933 |
| 1,924,592 | Bendix | Aug. 29, 1933 |
| 1,931,516 | Thompson | Oct. 24, 1933 |
| 1,936,865 | Taylor | Nov. 28, 1933 |
| 1,967,390 | Bendix | July 24, 1934 |
| 2,120,917 | House | June 17, 1938 |
| 2,280,784 | Berno | Apr. 28, 1942 |

FOREIGN PATENTS

| Number | Country | Date |
|---|---|---|
| 327,770 | Great Britain | Apr. 17, 1930 |
| 330,345 | Great Britain | June 12, 1930 |